US011252150B2

(12) United States Patent
Bhatt et al.

(10) Patent No.: US 11,252,150 B2
(45) Date of Patent: Feb. 15, 2022

(54) SYSTEMS AND METHODS FOR SMARTCARD BIOMETRIC ENROLLMENT

(71) Applicant: MASTERCARD INTERNATIONAL INCORPORATED, Purchase, NY (US)

(72) Inventors: Sumeet Bhatt, Jericho, NY (US); Ashfaq Kamal, Stamford, CT (US); Robert D. Reany, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1197 days.

(21) Appl. No.: 15/583,085

(22) Filed: May 1, 2017

(65) Prior Publication Data

US 2018/0165676 A1 Jun. 14, 2018

Related U.S. Application Data

(60) Provisional application No. 62/431,609, filed on Dec. 8, 2016.

(51) Int. Cl.
*G06Q 20/18* (2012.01)
*H04L 29/06* (2006.01)
(Continued)

(52) U.S. Cl.
CPC ........ *H04L 63/0861* (2013.01); *G06F 16/955* (2019.01); *G06F 21/32* (2013.01);
(Continued)

(58) Field of Classification Search
CPC ........ G06Q 10/00; G06Q 20/00; G06Q 30/00; G06Q 40/00; G06Q 20/1085; G06Q 20/18;
(Continued)

(56) References Cited

U.S. PATENT DOCUMENTS 6,298,336 B1 * 10/2001 Davis .................. G06Q 20/105
705/41
7,028,185 B2 * 4/2006 Wheeler ................ G06F 21/32
380/282
(Continued)

FOREIGN PATENT DOCUMENTS

CN          1488230 A    4/2004
CN        105103525 A   11/2015
(Continued)

OTHER PUBLICATIONS

Kadena et al., "Adoption of biometrics in mobile devices", Proceedings of FIKUSZ Symposium for Young Researches: 140-148, Budapest: Obuda, University Keleti Karoly Faculty of Economics, ProQuest Document Id: 2030411601 . (Year: 2017).*

(Continued)

*Primary Examiner* — Frantzy Poinvil
(74) *Attorney, Agent, or Firm* — Michael Best & Friedrich LLP

(57) ABSTRACT

Systems, methods, and non-transitory computer readable media relate to smartcard biometric enrollment. In an embodiment that does not require a user to visit a central location to provide fingerprint images, an activation code corresponding to a unique ID that uniquely identifies a user of a service is generated and sent to the user. In response, at least one finger image is received from a user device. The image is processed to isolate a fingerprint image, which is used to generate a biometric template that is sent to a smartcard manufacturer and used to configure a smartcard for biometric authentication of the user. In another embodiment, a kiosk/ATM provides smartcard biometric enrollment by detecting a smartcard in the smartcard reader, verifying an ID of a user associated with the smartcard, capturing a biometric image from the user, processing the biometric (Continued)

image to generate a biometric template, and storing the biometric template on the smartcard.

19 Claims, 5 Drawing Sheets

(51) Int. Cl.
G06F 16/955 (2019.01)
G06Q 20/00 (2012.01)
G06F 21/32 (2013.01)
G06Q 20/10 (2012.01)
G06Q 20/34 (2012.01)
G06Q 20/40 (2012.01)

(52) U.S. Cl.
CPC ......... *G06Q 20/00* (2013.01); *G06Q 20/1085* (2013.01); *G06Q 20/18* (2013.01); *G06Q 20/354* (2013.01); *G06Q 20/40145* (2013.01); *H04L 63/0853* (2013.01); *H04L 63/10* (2013.01); *G06F 2221/2117* (2013.01); *H04L 63/062* (2013.01); *H04L 63/0876* (2013.01)

(58) Field of Classification Search
CPC ............ G06Q 20/354; G06Q 20/40145; H04L 63/0861; H04L 63/0853; H04L 63/10; H04L 63/062; H04L 63/0876; G06F 16/955; G06F 21/32; G06F 2221/2117
USPC ....................................................... 705/3–44
See application file for complete search history.

(56) References Cited

U.S. PATENT DOCUMENTS

| 7,225,338 | B2 | 5/2007 | Khan et al. | |
| 7,367,049 | B1 | 4/2008 | Robinson et al. | |
| 7,690,032 | B1 | 3/2010 | Peirce | |
| 7,780,091 | B2* | 8/2010 | Beenau | G06Q 20/4012 235/487 |
| 7,921,297 | B2 | 4/2011 | Ortiz et al. | |
| 8,489,513 | B2* | 7/2013 | Bishop | G06Q 20/027 705/66 |
| 8,577,813 | B2* | 11/2013 | Weiss | G06Q 20/40 705/76 |
| 8,595,075 | B2* | 11/2013 | de Sylva | G06Q 20/209 705/24 |
| 8,706,630 | B2* | 4/2014 | Graves | G06Q 20/3829 705/44 |
| 8,831,994 | B1* | 9/2014 | Hoffman | H04L 63/10 705/50 |
| 8,930,273 | B2* | 1/2015 | Varadarajan | G06Q 20/3433 705/44 |
| 9,430,629 | B1 | 8/2016 | Ziraknejad et al. | |
| 9,953,149 | B2* | 4/2018 | Tussy | G06Q 20/40145 |
| 10,154,029 | B1 | 12/2018 | Griffin | |
| 2001/0011680 | A1 | 8/2001 | Soltesz et al. | |
| 2004/0010697 | A1 | 1/2004 | White | |
| 2008/0015994 | A1* | 1/2008 | Bonalle | G06Q 20/3674 705/44 |
| 2009/0037978 | A1 | 2/2009 | Luque et al. | |
| 2009/0076966 | A1* | 3/2009 | Bishop | G07F 7/0866 705/67 |
| 2010/0175114 | A1 | 7/2010 | Little | |
| 2010/0318783 | A1 | 12/2010 | Raj et al. | |
| 2011/0145904 | A1 | 6/2011 | Pizano et al. | |
| 2011/0191249 | A1* | 8/2011 | Bishop | G06Q 20/382 705/67 |
| 2012/0293642 | A1 | 11/2012 | Berini et al. | |
| 2014/0067683 | A1* | 3/2014 | Varadarajan | G06Q 20/04 705/44 |
| 2014/0081857 | A1* | 3/2014 | Bonalle | G06Q 20/105 705/41 |
| 2014/0310182 | A1 | 10/2014 | Cummins | |
| 2014/0337221 | A1* | 11/2014 | Hoyos | G06K 9/46 705/44 |
| 2015/0012427 | A1* | 1/2015 | Phillips | G06Q 20/363 705/41 |
| 2015/0058931 | A1 | 2/2015 | Miu et al. | |
| 2015/0227937 | A1 | 8/2015 | Giles | |
| 2015/0348018 | A1* | 12/2015 | Campos | G06Q 20/12 705/41 |
| 2016/0019539 | A1* | 1/2016 | Hoyos | G06Q 20/40145 705/75 |
| 2016/0189063 | A1* | 6/2016 | Nie | G06Q 10/02 705/5 |
| 2016/0226868 | A1 | 8/2016 | Harding | |
| 2016/0253669 | A1* | 9/2016 | Yoon | G06Q 20/327 705/75 |
| 2016/0381013 | A1 | 12/2016 | Buscemi | |
| 2017/0300678 | A1 | 10/2017 | Metke et al. | |
| 2018/0091505 | A1 | 3/2018 | Farrell et al. | |
| 2018/0167386 | A1 | 6/2018 | Bhatt et al. | |
| 2018/0167387 | A1 | 6/2018 | Bhatt et al. | |
| 2018/0285868 | A1 | 10/2018 | O'Hara et al. | |
| 2019/0147684 | A1 | 5/2019 | Tanaka | |

FOREIGN PATENT DOCUMENTS

| EP | 2037421 | A1 | 3/2009 |
| GB | 2531095 | A | 4/2016 |
| WO | 2004/031920 | A1 | 4/2004 |
| WO | 2010/084143 | A1 | 7/2010 |
| WO | 2013/051010 | A2 | 4/2013 |
| WO | 2017/055373 | A1 | 4/2017 |
| WO | 2018/106430 | A1 | 6/2018 |
| WO | 2018/106431 | A1 | 6/2018 |
| WO | 2018/106432 | A1 | 6/2018 |

OTHER PUBLICATIONS

International Search Report and Written Opinion for Application No. PCT/US2017/062519 dated Mar. 2, 2018 (11 pages).
International Search Report and Written Opinion for Application No. PCT/US2017/062525 dated Mar. 2, 2018 (14 pages).
International Search Report and Written Opinion for Application No. PCT/US2017/062527 dated Feb. 28, 2018 (14 pages).
Jordaan et al., "A Biometrics-Based Solution to Combat SIM Swap Fraud," ECCV 2016 Conference, 2016, Springer International Publishing, Cham, pp. 70-87.
Chinese Patent Office Action for Application No. 201780083235.3 dated Mar. 31, 2021 (22 pages, English translation included).
China National Intellectual Property Administration Notification of Second Office Action for Application No. 201780083235.3 dated Dec. 10, 2021 (16 pages including English translation).
Australian Patent Office Examination Report No. 1 for Application No. 2017372477 dated Oct. 1, 2021 (3 pages).

* cited by examiner

SYSTEMS AND METHODS FOR SMARTCARD BIOMETRIC ENROLLMENT

RELATED APPLICATIONS

This application claims priority to U.S. Provisional Application No. 62/431,609, filed on Dec. 8, 2016, and incorporated herein in its entirety by reference. This application is also co-filed with co-owned U.S. patent application Ser. No. 15/583,147, titled "Systems and Methods for Decentralized Biometric Enrollment", and co-owned U.S. patent application Ser. No. 15/583,174, titled "Systems and Methods for Biometric Authentication Using Existing Databases", both of which are incorporated herein in their entirety by reference.

BACKGROUND

Authentication of a user is often required when initiating a communication. For example, where the user wishes to secure items over the Internet, the user is asked for authentication (i.e., proof that the user initiating the communication is who they say they are) before remuneration occurs. Such authentication is typically a password or security code that is associated with an identity of an account used to obtain the merchandise or service. However, biometric authentication is becoming an increasingly popular method of identity verification. Before any such biometric authentication may occur, the individual to be authenticated must provide biometric samples (e.g., images) for generating biometric templates that are used for authentication. This requires the individuals to present themselves at a particular location where their biometric images may be captured together with other evidence of their identity. For example, the individual may be asked to visit a particular location where biometric capture equipment is used to capture and record images of one or more biometric features of the individual, where the identity of the individual is verified by photo ID documents. The captured biometric images and/or biometric templates generated therefrom, are stored to allow future authentication of the individual from subsequently captured biometric images.

SUMMARY

Embodiments disclosed herein teach of configuring a smartcard with a biometric template of a user of the smartcard without requiring the user to present themselves at a particular location for biometric capture.

One embodiment relates to a method for smartcard biometric enrollment. An activation code corresponding to a unique ID that uniquely identifies a user of a service is generated and sent to the user. In response to the activation code, at least one finger image captured by a camera of a user device is received from the user device. The finger image is processed to isolate a fingerprint image therein. A fingerprint template is generated from the fingerprint image and send to a smartcard manufacturer for configuring a smartcard to implement biometric authentication of the user. The user is thereby enrolled for biometric authentication without requiring the user to visit a central location to provide the at least one fingerprint image.

Another embodiment relates to a kiosk/ATM for smartcard biometric enrollment. The kiosk/ATM includes a processor within the kiosk/ATM, a smartcard reader, a biometric capture device, and a memory communicatively coupled to the processor. The memory stores machine readable instructions that, when executed by the processor, perform the steps of: detecting a smartcard in the smartcard reader; verifying an ID of a user associated with the smartcard; capturing a biometric image from the user; processing the biometric image to generate a biometric template; and storing the biometric template on the smartcard.

In another embodiment, a non-transitory computer readable medium has computer executable instructions stored thereon and is executed by a processor of a user's device to perform a method of smartcard biometric enrollment. The non-transitory computer readable medium includes instructions for receiving an activation code; instructions for decoding and validating the activation code, instructions for prompting the user to capture a finger image when the activation code is valid; instructions for validating the finger image when the activation code is valid; and instructions for sending the validated finger image to a server when the activation code is valid.

DETAILED DESCRIPTION OF THE EMBODIMENTS

Figure 1:
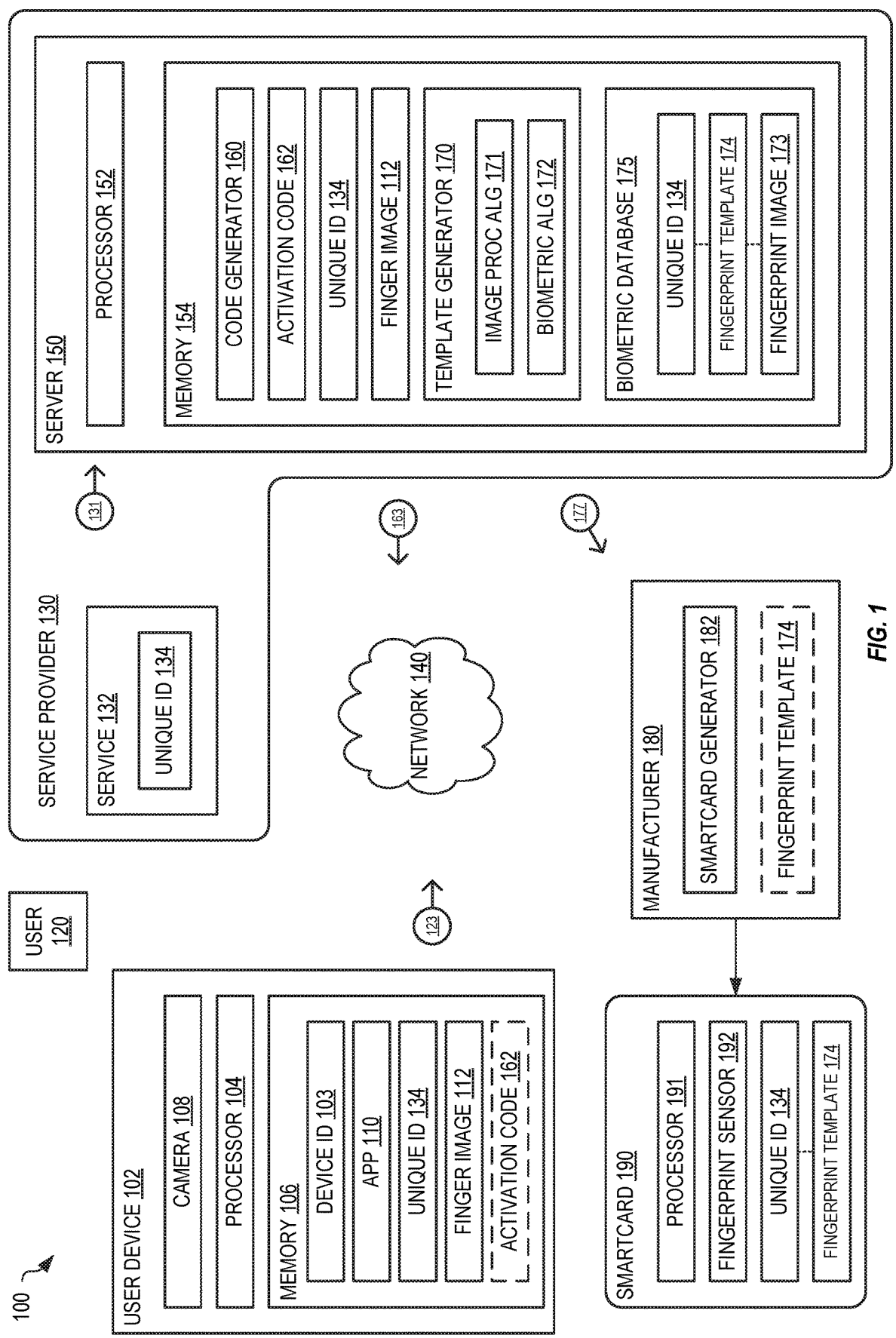
FIG. 1 shows one example system for smartcard biometric enrollment, in an embodiment.

FIG. 1 shows one example system 100 for smartcard biometric enrollment. In embodiments, a user 120 is already signed up for a service 132 of service provider 130, and has provided information to service provider 130 indicating a desire to utilize biometric authentication for added security. In embodiments, user 120 interacts with service provider 130 to establish a unique ID 134 for using service 132 and to request issue of a smartcard 190. For example, service 132 represents one or more of a financial service (e.g., a bank account, an investment authority), a building access control, a data access service, and so on. Accordingly, unique ID 134 represents one or more of an account number (e.g., a bank account number, a financial card number, a customer account number, and so on), an access number, a social security number, and so on, that uniquely identifies user 120 to service 132. The following examples relate to fingerprint biometrics, however, other types of biometric (e.g., facial, iris, retina, and so on) may be used without departing from the scope hereof. In certain embodiments, smartcard 190 stores multiple templates and may store templates of different biometric types.

In one embodiment, service provider 130 is a financial institution that complies with "know your customer" (KYC) and has thereby established information to verify that the person claiming to be user 120 is not an imposter. As known to those skilled in the art, KYC is the process of a business, identifying and verifying the identity of its clients and may also refer to the bank regulation which governs these activities. See for example: Wikipedia topic "Know your customer". For example, where service provider 130 maintains a website that user 120 accesses to view and control their account, service provider 130 may require user 120 to answer additional security questions as proof of identity. It is envisioned that service 132 and user 120 would both benefit from increased security provided by biometric authentication of user 120.

System 100 includes a server 150 that communicates via a network 140 (e.g., the Internet) with a user device 102 of user 120. User device 102 is a computer that includes a camera 108 and may be selected from the group including: a smartphone, a tablet computer, desktop computer, and so on. User device 102 includes a processor 104 that is communicatively coupled with a memory 106 and camera 108. In embodiments, processor 104 may represent one or more digital processors. Memory 106 may represent one or both of volatile memory (e.g., RAM, DRAM, and SRAM, and so on) and non-volatile memory (e.g., ROM, EPROM, EEPROM, Flash memory, magnetic storage, optical storage, network storage, and so on). Memory 106 stores an app 110 that includes machine readable instructions that are executed by processor 104 to provide the functionality of user device 102 as described herein. App 110 may be specifically associated with service provider 130 and service 132. For example, where service provider 130 is a bank, app 110 may be provided by the bank to allow user 120 to access their account information.

Server 150 is a computer that include at least one processor 152 communicatively coupled to a memory 154. In embodiments, processor 152 represents one or more digital processors. Memory 154 may represent one or both of volatile memory (e.g., RAM, DRAM, and SRAM, and so on) and non-volatile memory (e.g., ROM, EPROM, EEPROM, Flash memory, magnetic storage, optical storage, network storage, and so on). Server 150 also may be implemented as a plurality of networked servers, as known in the art, without departing from the scope hereof. Server 150 may be part of a financial transaction entity (e.g., MasterCard, Visa, or the like) or may be part of service provider 130.

Memory 154 is shown storing a code generator 160 that includes machine readable instructions that are stored in memory 154 and executed by processor 152 to generate an activation code 162 (described below) based upon a unique ID 134. Code generator 160 is executed by processor 152 in response to a request for enrollment of user 120 for biometric authentication for service 132, where user 120 uses a unique ID 134 for service 132. For example, when user 120 signs-up for service 132, service provider 130 may automatically enroll user 120 for biometric authentication for service 132. In another example, user 120 may request enrollment in biometric authentication for service 132.

In embodiments, code generator 160 may be run selectively, such that activation code 162 is only generated for users (e.g., user 120) authorized to enroll for biometric authentication in association with unique ID 134. Activation code 162 thereby restricts enrollment for biometric authentication to users that are authorized to enroll. For example, user 120 logs in to service provider 130, using existing credentials (e.g., username and password) to verify themselves to service provider 130. Service provider 130 may ask additional security questions to verify that user 120 is who they claim to be. For example, where service provider 130 is a bank, service provider 130 complies with KYC and may use previously established information to verify that they are dealing with user 120 and not an imposter. In certain embodiments, app 110 is associated with service provider 130 and includes a first level of verification of user 120. For example, app 110 may utilize a password or PIN configured through service provider 130 for using service 132. To use app 110, user 120 is thus validated at this first level, thereby preventing use of app 110 on user device 102 by unauthorized persons.

Once user 120 is verified by service provider 130, service provider 130 may instruct (e.g., by sending a secure message 131 to server 150) code generator 160 to generate activation code 162 for user 120. For example, service provider 130 may indicate a method of delivery of the activation code 162, such as via a previously defined email address or a previously registered mobile number.

Activation code 162 may be specifically encoded for use by user 120 for service 132 based upon unique ID 134, and may be specifically tied to one or more of app 110 and/or user device 102. For example, activation code 162 may be encoded to include unique ID 134 and/or a mobile number (or other unique identification value) of user device 102 based upon previously registered information. Such encoding ensures that the activation code is used only with the intended unique ID 134, and thus only used by user 120 and/or user device 102. For example, app 110 may decode activation code 162 to determine an encoded unique ID for comparison to unique ID 134 stored within user device 102. When the encoded unique ID does not match Unique ID 134, the activation code is not validated and app 110 does not allow the user to capture biometric images. In another example, app 110 may decode activation code 162 to determine an encoded device ID for comparison to a unique device ID 103 of user device 102. When the encoded device ID does not match unique device ID 103 of user device 102, the activation code is not validated. Unique device ID 103 is for example one or more of a serial number, a MAC address, a telephone number, or other identifier that is unique to user device 102.

In embodiments, app 110 only requests biometric images from user 120 when an entered or received activation code is valid. For example, user device 102 may receive activation code 162 (e.g., in message 163) from server 150 or the activation code may be entered into user device 102 by user 120, wherein app 110 validates the entered activation code, such as by contacting server 150 and receiving an indication as to validity of the activation code from server 150, or by validating encoded information, such as unique ID 134 and/or a unique ID (e.g., mobile number) of user device 102. When activation code 162 is not determined as valid, app 110 may inhibit capture of biometric images and thus biometric images are not sent to server 150. Thus, when biometric images are sent to server 150, activation code 162 is valid and user 120 has been authenticated by app 110.

Once generated by code generator 160, activation code 162 is sent to user 120. For example, activation code 162 is sent electronically to user 120 via one or more of text (e.g., short message service (SMS)), email, push notification, and so on, based upon contact information of record for user 120 for service 132. In embodiments, enrollment for biometric authentication may only occur for users that have received activation code 162. When received by, or entered into, user device 102, activation code 162 may be temporarily stored in memory 106.

As indicated above, app 110 validates activation code 162 prior to initiating biometric image capture of user 120. More specifically, in embodiments, app 110 may decode unique ID 134 from activation code 162 for comparison to an identifier entered by user 120; where the entered identifier and the decoded unique ID do not match, app 110 determines that the activation code 162 is invalid. In another example, where activation code 162 is entered into app 110 by the user, app 110 sends the entered activation code to server 150 for validation. For example, server 150 may compare the entered activation code with activation code 162 generated by code generator 160 and determine that that the activation code is valid when the entered activation code matches activation code 162 within server 150. Server 150 then responds to app 110 to indicate whether the entered activation code is valid. Where activation code 162 is received electronically within app 110 from server 150, app 110 may not validate activation code 162.

If activation code 162 is valid, app 110 interacts with user 120 to capture at least one finger image 112 using camera 108. For example, app 110 may overlay a finger shaped outline onto a live image from camera 108 displayed on a screen of user device 102, thereby facilitating capture of a good image of the user's finger such that it includes at least part of the fingerprint.

Figure 2:
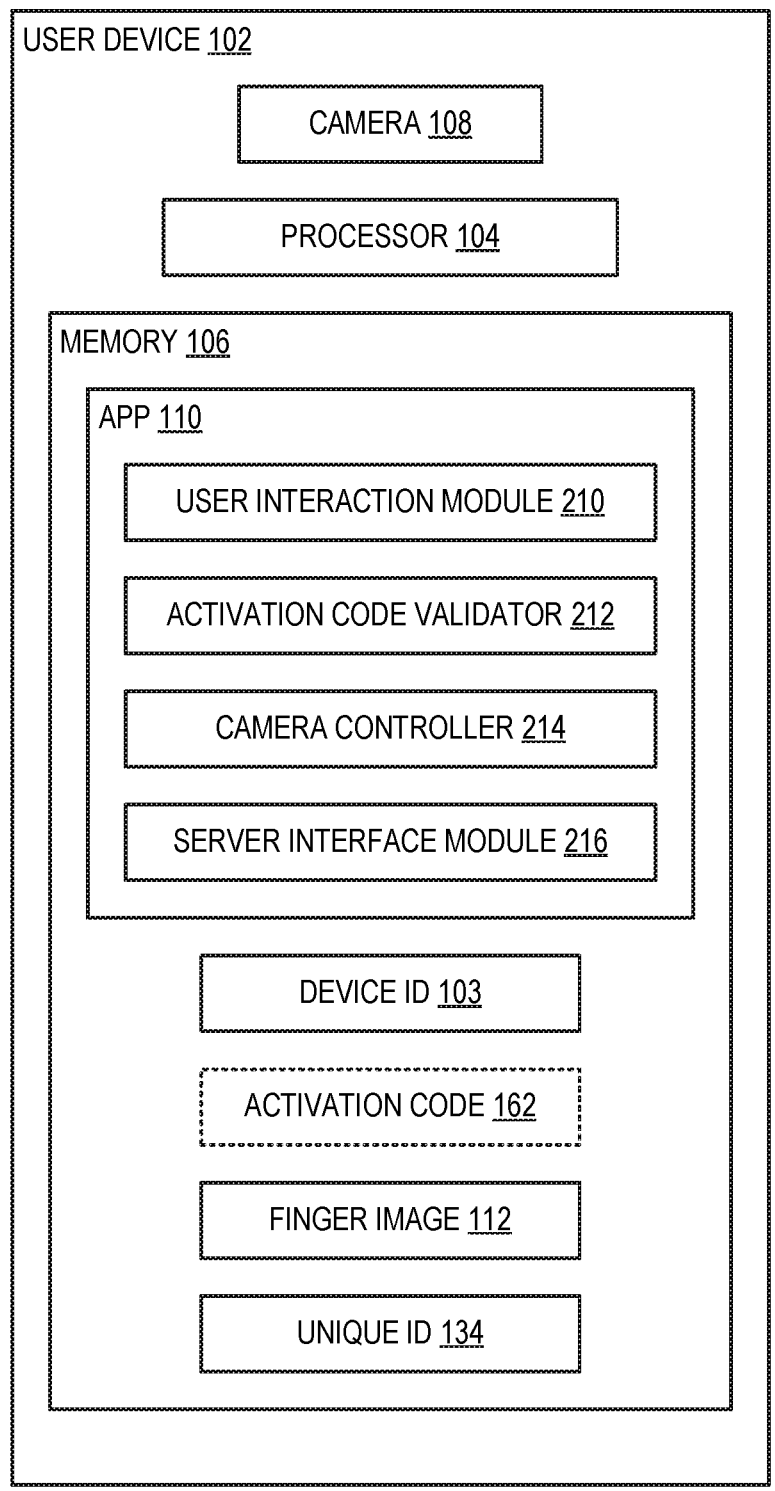
FIG. 2 is a schematic showing the user device of FIG. 1 in further example detail, in an embodiment.

FIG. 2 is a schematic showing user device 102 of FIG. 1 in further example detail. App 110 includes a user interaction module 210 that includes machine readable instruction that are executed by processor 104 to interact with user 120. App 110 also includes an activation code validator 212 for validating activation code 162. App 110 also includes a camera controller 214 for controlling camera 108. And, app 110 may include a service interface module 216 for interacting with server 150. User interaction module 210, activation code validator 212, camera controller 214, and service interface module 216 cooperate to perform the functionality of user device 102 described herein.

User interaction module 210 is invoked to interact with user 120 and receive activation code 162. Receipt of activation code 162 then invokes activation code validator 212 to validate activation code 162. In one embodiment, activation code validator 212 sends the entered activation code to server 150 for validation, wherein server 150 maintains a database of issued/valid activation codes and may thereby determine whether the entered activation code is valid. In another embodiment, activation code 162 is encoded with validation information that is evaluated by activation code validator 212 to determine whether the entered activation code is valid.

User interaction module 210 invokes camera controller 214 to control camera 108 to capture finger image 112 of user 120. User interaction module 210 then invokes service interface module 216 to send finger image 112 to server 150 in message 123.

Server 150 includes a template generator 170 that utilizes an image processing algorithm 171 and one or more biometric algorithms 172 to processes finger image 112 to generate fingerprint template 174. For example, template generator 170 may use image processing algorithm 171 to generate a fingerprint image 173 by isolating the fingerprint within finger image 112, and may then use one or more biometric algorithms 172 to generate fingerprint template 174 from fingerprint image 173. In one embodiment, server 150 includes a biometric database 175 for storing one or both of fingerprint image 173 and fingerprint template 174 in association with unique ID 134. Server 150 then sends fingerprint template 174 to a manufacturer 180 that produces smartcard 190. Smartcard 190 includes a processor 191 and a fingerprint sensor 192 that cooperate to authenticate user 120 based upon fingerprint template 174. In embodiments, template generator 170 and biometric algorithms 172 operate within user device 102 to generate and send fingerprint template 174 to server 150 and/or manufacturer 180.

Manufacturer 180 receives fingerprint template 174 from server 150 in message 177 and uses a smartcard generator 182 to include fingerprint template 174 on smartcard 190. For example, manufacturer 180 may configure a previously made smartcard with fingerprint template 174 and unique ID 134, or may manufacture a new smartcard (e.g., new biometric contactless payment card with integrated fingerprint sensor) to include unique ID 134 and fingerprint template 174.

Figure 3:
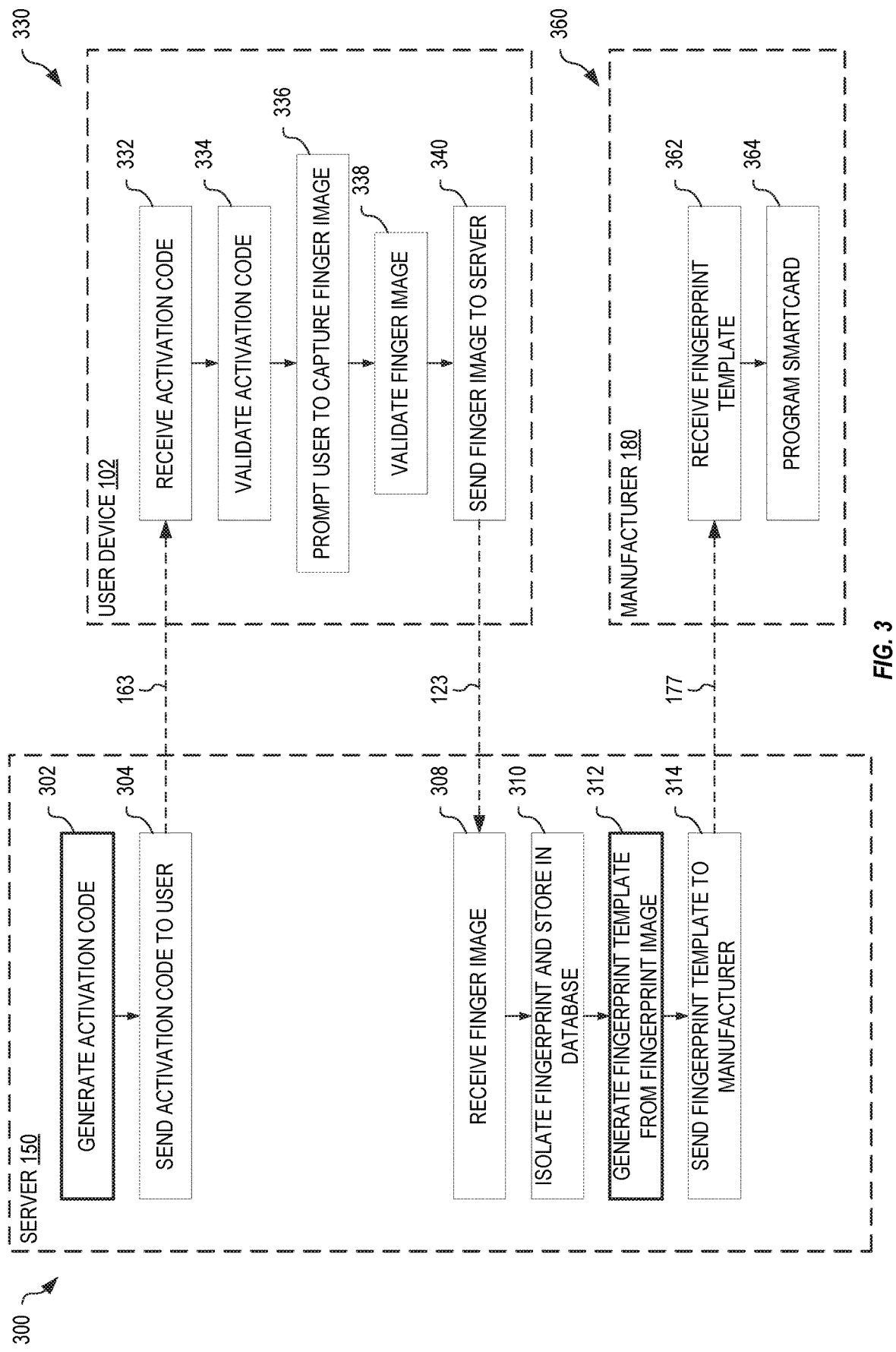
FIG. 3 is a flowchart illustrating smartcard biometric enrollment utilizing cooperation between example methods of the server, user device, and manufacturer of FIG. 1, in an embodiment.

FIG. 3 is a flowchart illustrating smartcard biometric enrollment utilizing cooperation between example methods (i.e., methods 300, 330 and 360 respectively) of server 150, user device 102, and manufacturer 180 of FIG. 1. In this example, methods 300, 330 and 360 are invoked when service provider 130 initiates enrollment of user 120 in biometric authentication for service 132. FIGS. 1, 2, and 3, are best viewed together with the following description.

In step 302, method 300 generates an activation code. In one example of step 302, code generator 160 generates activation code 162 based upon unique ID 134 of service 132 used by user 120. In step 304, method 300 sends the activation code to the user. In one example of step 304, code generator 160 sends activation code 162 to user 120 using message 163 (e.g., e-mail or text messaging) to user device 102. Method 300 then waits to receive at least one biometric image corresponding to activation code 162 from user device 102.

In step 332, method 330 receives an activation code. In one example of step 332, app 110 receives activation code 162 in message 163 from server 150. In step 334, method 330 validates the received activation code. In one example of step 334, app 110 decodes activation code 162 for validation against one or more of unique ID 134 and/or a mobile number (or other unique identification value) of user device 102. In embodiments, method 330 proceeds only when then received activation code is determined as valid.

In step 336, method 330 prompts the user to capture a fingerprint image. In one example of step 336, user interaction module 210 cooperates with camera controller 214 to provide instructions and directions to user 120 and to capture finger image 112 using camera 108. In some embodiments, step 338 validates the finger image captured in step 336. In one example of step 338, user interaction module 210 performs image processing of finger image 112 to determine whether a contained fingerprint is of sufficient clarity, and instructs user 120 to repeat the finger capture process until an image is captured of sufficient clarity for further processing. In step 340, method 330 sends the finger image to the server. In one example of step 340, app 110 sends finger image 112 in message 123 to server 150.

In step 308, method 300 receives the finger image. In one example of step 308, template generator 170 receives message 123 containing finger image 112 from user device 102 via network 140. In step 310, method 300 isolates the fingerprint within the finger image and stores the fingerprint image within a database. In one example of step 310, template generator 170 utilizes image processing algorithm 171 to isolate the fingerprint within finger image 112 as fingerprint image 173, and stores it within biometric database 175 in association with unique ID 134.

In step 312, method 300 generates a fingerprint template from the fingerprint image. In one example of step 312, template generator 170 utilizes one or more biometric algorithms 172 to process fingerprint image 173 and generate fingerprint template 174. In step 314, method 300 sends the fingerprint template to a smartcard manufacturer. In one example of step 314, template generator 170 sends fingerprint template 174 to manufacturer 180 in message 177.

In step 362, method 360 receives the fingerprint template. In one example of step 362, smartcard generator 182 receives fingerprint template 174 within message 177 from server 150. In step 364, method 360 programs the smartcard with the fingerprint template. In one example of step 364, smartcard generator 182 configures smartcard 190 with fingerprint template 174.

Figure 4:
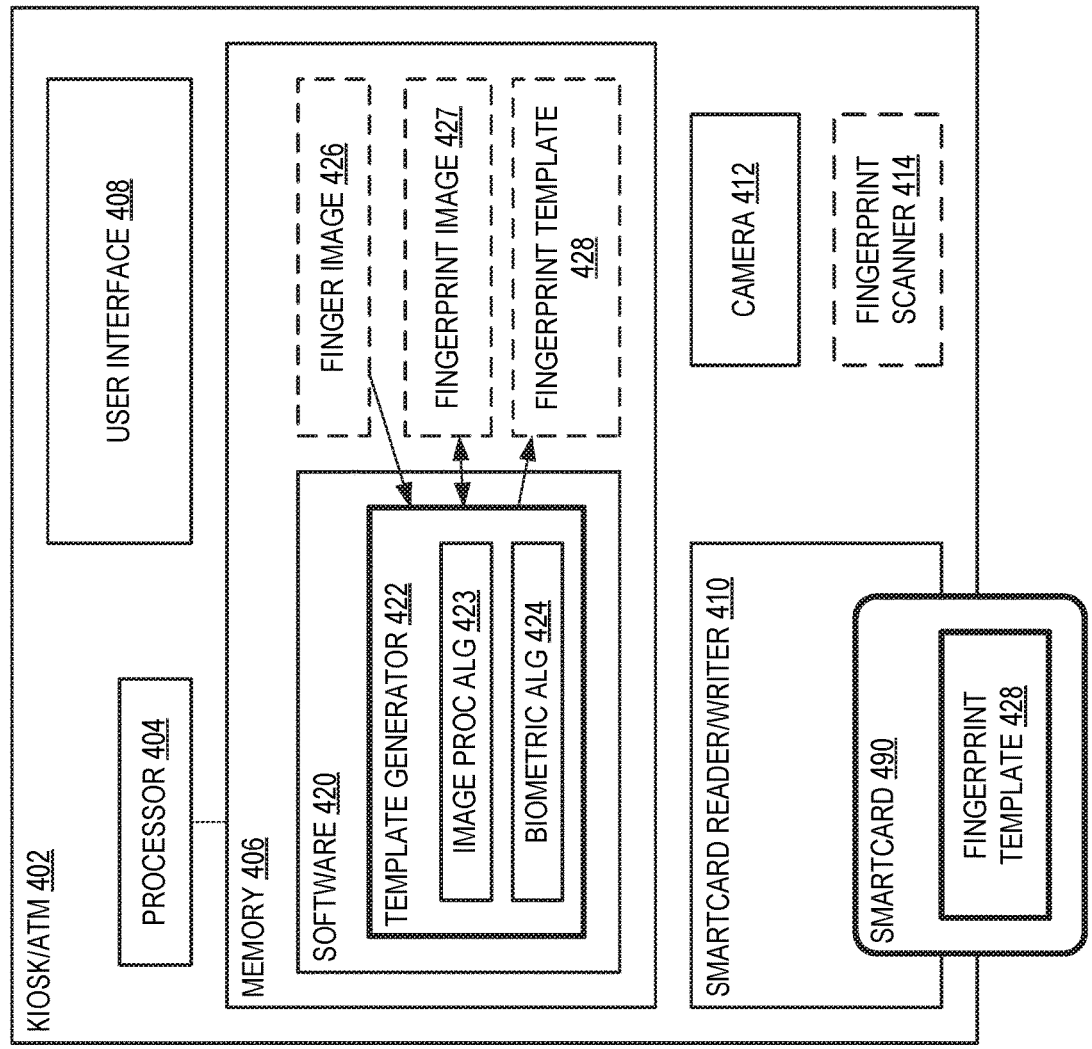
FIG. 4 shows one example kiosk/ATM configured for smartcard biometric enrollment, in an embodiment.

FIG. 4 shows one example kiosk/ATM 402 in embodiments envisioning the use of a kiosk or ATM for smartcard biometric enrollment. Automated Teller Machines (ATMs) are ubiquitous and frequently visited by users.

In embodiments, Kiosk/ATM 402 programs a smartcard 490 with a fingerprint template 428 generated from a fingerprint image captured from a user 460 at the Kiosk or ATM. Kiosk/ATM 402 is a computer and includes a processor 404, a memory 406, a user interface 408 (e.g., a touch screen and/or keypad), a smartcard reader/writer 410 and a camera 412. Smartcard reader/writer 410 is also configured to write to smartcard 490. In one embodiment, kiosk/ATM 402 also includes a fingerprint scanner 414. The following examples relate to fingerprint biometrics; however, kiosk/ATM 402 may implement other types of biometric (e.g., facial, iris, and so on) without departing from the scope hereof. For example, camera 412 may be used to capture facial and/or iris images for biometric authentication enrollment and authentication purposes of smartcard 490. In embodiments, smartcard 490 stores multiple templates of different biometric types, and may store more than one template for each biometric type.

Memory 406 is shown with software 420 that includes machine readable instructions that are executed by processor 404 to provide functionality of kiosk/ATM 402. Processor 404 executes instructions of software 420 to validate user 460 when a smartcard 490 is detected within smartcard reader/writer 410. For example, smartcard 490 may have an associated PIN, which user 460 enters into user interface 408 when prompted. In one embodiment, software 420 interacts with server 450 of service provider 430 to confirm identity of user 460, wherein a user validator 452 of server 450 interacts with user 460 via user interface 408 to receive answers to additional security questions already learned by service provider 430.

Software 420 may detect the capability of smartcard 490 and offer to configure or reconfigure fingerprint template 428 for smartcard 490. For example, software 420 may display a menu option for (re)configuring fingerprint biometrics of smartcard 490. Where user 460 responds by selecting to (re)configure fingerprint biometrics of smartcard 490, software 420 interacts with user 460 via user interface 408 to provide instructions for user 460 to capture one or more fingerprint images 427.

Where kiosk/ATM 402 is configured with fingerprint scanner 414, software 420 instructs user 460 to place a finger for scanning on fingerprint scanner 414 and captures at least one fingerprint image 427, which may be temporarily stored within memory 406. Where kiosk/ATM 402 does not include fingerprint scanner 414, software 420 instructs user 120 to present a fingerprint for capture by camera 412 and captures at least one finger image 426 that includes at least part of a fingerprint of user 460.

Software 420 then invokes a template generator 422 to process finger image 426 or fingerprint image 427 and generate fingerprint template 428. For example, where camera 412 was used to capture finger image 426, template generator 422 utilizes an image processing algorithm 423 to isolate the fingerprint within finger image 426 to form fingerprint image 427. Template generator 422 utilizes one or more biometric algorithms 424 for identifying features within fingerprint image 427 and for generating fingerprint template 428.

Where multiple finger images 426 are captured, each one containing at least part of the fingerprint of user 460, template generator 422 may utilize image processing algorithm 423 to process more than one finger image 426, isolating within each finger image 426 at least part of the fingerprint of user 460, and then assembling fingerprint image 427 from these multiple isolated parts of the fingerprint.

Where fingerprint template 428 is generated successfully (e.g., of sufficient quality to identify user 460), software 420 stores fingerprint template 428 on smartcard 490 using smartcard reader/writer 410. Software 420 may check that fingerprint template 428 has been successfully written to smartcard 490, and display a message to indicate the success.

Figure 5:
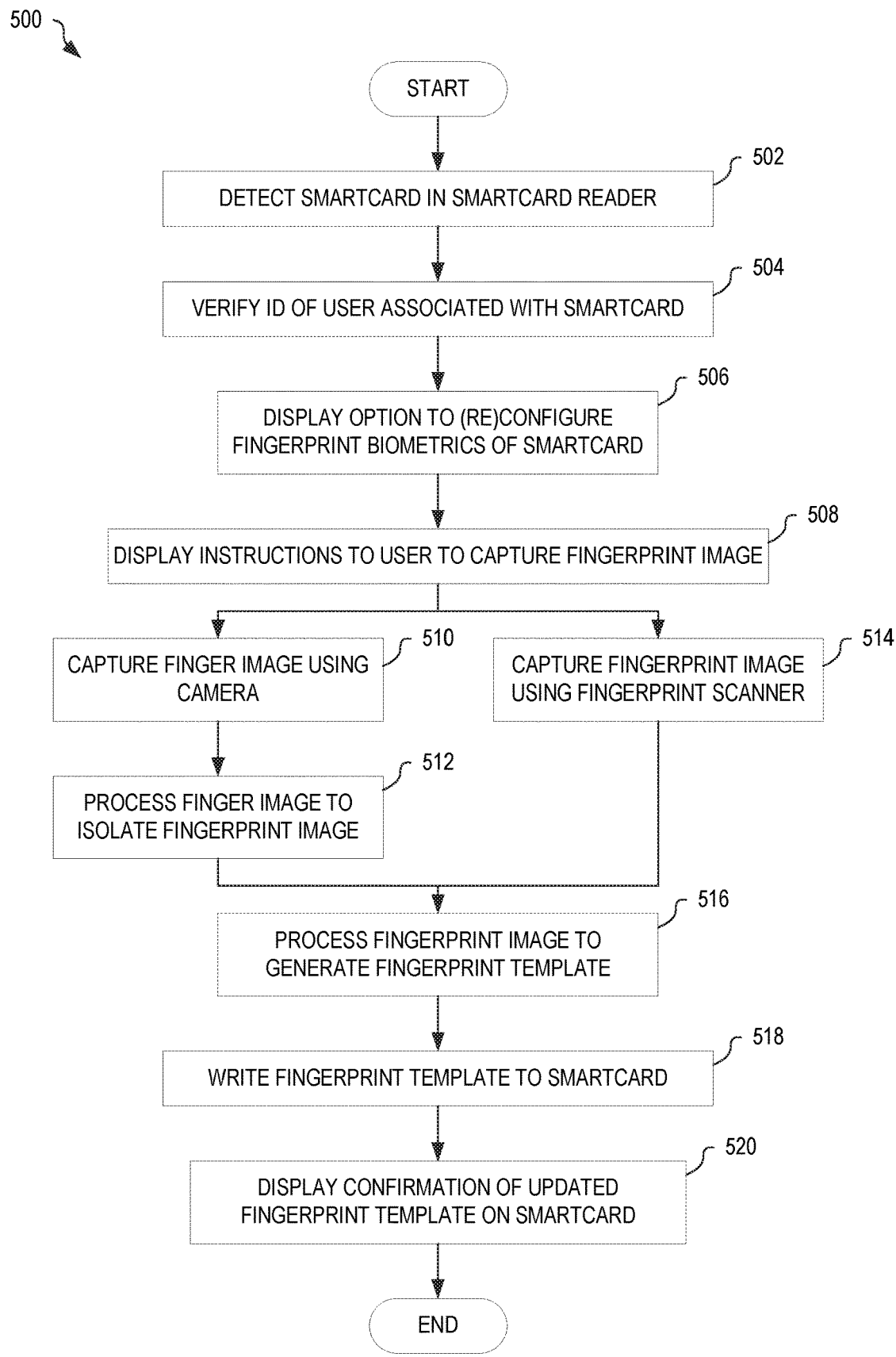
FIG. 5 is a flowchart illustrating one example method for smartcard biometric enrollment, in an embodiment.

FIG. 5 is a flowchart illustrating one example method 500 for smartcard biometric enrollment. In embodiments, method 500 is implemented at least in part within software 420 and/or hardware of kiosk/ATM 402 of FIG. 4. In step 502, method 500 detects a smartcard within a smartcard reader. In one example of step 502, software 420 detects insertion of smartcard 490 into smartcard reader/writer 410 of kiosk/ATM 402. In step 504, method 500 verifies an ID of the user associated with the smartcard. In one example of step 504, software 420 interacts with user 460 to receive a PIN corresponding to smartcard 490, wherein possession of the PIN indicates that user 460 is authorized to use smartcard 490. In step 506, method 500 displays an option to re(configure) fingerprint biometrics of the smartcard. In one example of step 506, software 420 displays, on user interface 408, a menu of options for selection by user 460, including re(configuring) of fingerprint biometrics of smartcard 490. Method 500 proceeds with step 508 when the user selects the menu option.

In step 508, method 500 displays instructions to the user to capture a fingerprint image. In one example of step 508, software 420 displays instructions on user interface 408 for user 460 to present a fingerprint to camera 412. In another example of step 508, software 420 displays instructions on user interface 408 for user 460 to provide a fingerprint to fingerprint scanner 414. Where the user elects to use the camera, method 500 continues with step 510; otherwise, method 500 continues with step 514.

In step 510, method 500 captures a finger image using the camera. In one example of step 510, camera 412 captures finger image 426 containing at least part of a fingerprint of user 460. In step 512, method 500 processes the image to isolate the fingerprint image. In one example of step 512, template generator 422 utilizes image processing algorithm 423 to process finger image 426 to isolates the fingerprint contained therein and to form fingerprint image 427. Method 500 then continues with step 516.

In step 514, method 500 captures a fingerprint image using the fingerprint scanner. In one example of step 514, fingerprint scanner 414 captures fingerprint image 427 containing at least part of a fingerprint of user 460.

In step 516, method 500 processes the fingerprint image to generate a fingerprint template. In one example of step 516, software 420 invokes template generator 422 to utilize one or more biometric algorithms 424 to process fingerprint image 427 and generate fingerprint template 428.

In step 518, method 500 writes the fingerprint template to the smartcard. In one example of step 518, software 420 writes fingerprint template 428 to smartcard 490 using smartcard reader/writer 410. In step 520, method 500 displays confirmation of the updated fingerprint template on the smartcard. In one example of step 520, software 420 displays a message indicating confirmation that fingerprint template 428 has been written to smartcard 490.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for smartcard biometric enrollment, comprising:
   generating, with a server, an activation code corresponding to a unique identifier (unique ID) that uniquely identifies a user of a service;
   electronically sending, with the server, the activation code to a user device of the user;
   receiving, with the server, at least one finger image from the user device in response to the activation code, the finger image being captured by a camera of the user device;
   processing, with the server, the finger image to isolate a fingerprint image therein;
   generating, with the server, a fingerprint template from the fingerprint image; and
   electronically sending, with the server, the fingerprint template to a smartcard manufacturer for configuring with a smartcard to implement biometric authentication of the user,
   wherein the user is enrolled for biometric authentication without requiring the user to visit a central location to provide the at least one fingerprint image.

2. The method of claim 1, wherein generating the activation code further includes encoding a unique device identifier (unique device ID) of the user device within the activation code, wherein an app running on the user device validates the activation code based upon the unique device ID.

3. The method of claim 2, wherein the unique device ID being selected from the group including a serial number of the user device, a media access control address (MAC address) of the user device, and a telephone number of the user device.

4. The method of claim 2, wherein the app is associated with a service provider of the service and operates to validate the user of the app to capture the finger image.

5. The method of claim 1, wherein processing comprising utilizing an image processing algorithm to isolate the fingerprint image within the finger image.

6. The method of claim 1, further comprising storing one or both of the finger image and the fingerprint image in a database in association with the unique ID.

7. A kiosk/automated teller machine (kiosk/ATM) for smartcard biometric enrollment, comprising:
   a processor within the kiosk/ATM;
   a smartcard reader/writer;
   a biometric capture device; and
   a memory, communicatively coupled to the processor, storing machine readable instructions that, when executed by the processor, perform a set of operations including:
   detecting a smartcard in the smartcard reader/writer;
   verifying of an identity (ID) of a user associated with the smartcard;
   capturing a biometric image from the user;
   processing the biometric image to generate a biometric template; and
   storing the biometric template on the smartcard,
   wherein the biometric template includes only identifying features of the biometric image.

8. The kiosk/ATM of claim 7, wherein the biometric capture device further includes a fingerprint scanner.

9. The kiosk/ATM of claim 8, wherein the set of operations further includes processing the biometric image using a biometric algorithm to form the biometric template.

10. The kiosk/ATM of claim 7, wherein the biometric capture device further includes a camera.

11. The kiosk/ATM of claim 10, wherein the set of operations further includes implementing an image processing algorithm to process a finger image captured by the biometric capture device to isolate a fingerprint therein and generate the biometric template.

12. The kiosk/ATM of claim 10, wherein the set of operations further includes processing multiple finger images to form the biometric image, each of the multiple finger images comprising a different part of a fingerprint of the user.

13. The kiosk/ATM of claim 7, wherein the set of operations further includes processing the biometric image using a biometric algorithm to form the biometric template.

14. A non-transitory computer readable medium with computer executable instructions stored thereon that, when executed by a processor of a user device, cause the processor to perform a set of operations comprising:
   receiving an activation code;
   decoding and validating the activation code;
   prompting a user of the user device to capture a finger image when the activation code is valid;
   receiving the finger image;
   validating the finger image;
   sending the finger image that is validated to a servers
   decoding the activation code to determine an encoded device identifier (encoded device ID); and
   comparing the encoded device ID to a unique device identifier (unique device ID) of the user device,
   wherein the activation code is valid when the encoded device ID is equal to the unique device ID of the user device.

15. The non-transitory computer readable medium of claim 14, wherein the set of operations further includes:
   sending the activation code to the server; and
   receiving an indication of validity of the activation code from the server.

16. The non-transitory computer readable medium of claim 14, wherein the set of operations further includes inhibiting capture and sending of biometric images when one or both of (a) the activation code is not valid and (b) the user is not verified.

17. The non-transitory computer readable medium of claim 16, wherein the set of operations further includes:
   decoding the activation code to determine an encoded unique ID; and
   comparing the encoded unique ID to a unique identifier (unique ID) stored on the user device;
   wherein the activation code is valid when the encoded unique ID matches the unique ID of the user device.

18. The non-transitory computer readable medium of claim 16, wherein the set of operations further includes implementing a first level of verification of the user based upon at least one of a PIN and a password.

19. The non-transitory computer readable medium of claim 14, wherein the set of operations further includes:
processing the finger image to determine whether a contained fingerprint is of sufficient clarity for generating a biometric template;
prompting the user to capture an additional finger image when the contained fingerprint is not of sufficient clarity for generating the biometric template; and
repeating the instructions for processing and sending the additional finger image to the server when the contained fingerprint is of sufficient clarity for generating the biometric template.

* * * * *